(12) United States Patent
Goossens et al.

(10) Patent No.: US 11,423,629 B2
(45) Date of Patent: *Aug. 23, 2022

(54) AUTOMATIC RENDERING OF 3D SOUND

(71) Applicant: Apple Inc., Cupertino, CA (US)

(72) Inventors: Thomas Goossens, Paris (FR); Sebastien Metrot, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,708

(22) Filed: Dec. 7, 2018

(65) Prior Publication Data

US 2019/0108688 A1   Apr. 11, 2019

Related U.S. Application Data

(63) Continuation of application No. 14/732,750, filed on Jun. 7, 2015, now Pat. No. 10,176,644.

(51) Int. Cl.
| | |
|---|---|
| *G06T 19/20* | (2011.01) |
| *A63F 13/54* | (2014.01) |
| *G10L 21/10* | (2013.01) |
| *H04S 3/00* | (2006.01) |
| *H04S 7/00* | (2006.01) |

(52) U.S. Cl.
CPC .............. *G06T 19/20* (2013.01); *A63F 13/54* (2014.09); *G10L 21/10* (2013.01); *H04S 3/008* (2013.01); *H04S 7/30* (2013.01); *G06T 2210/61* (2013.01); *G06T 2219/2016* (2013.01); *H04S 2400/11* (2013.01)

(58) Field of Classification Search
CPC ..... G06T 19/20; G06T 2210/61; A63F 13/54; G10L 21/10
USPC ......................................................... 345/473
See application file for complete search history.

(56) References Cited

U.S. PATENT DOCUMENTS

| | | | |
|---|---|---|---|
| 5,633,993 A | 5/1997 | Redmann | |
| 5,768,393 A | 6/1998 | Mukojima | |
| 7,492,915 B2 | 2/2009 | Jahnke | |
| 9,561,431 B1* | 2/2017 | Pulido | .................. A63F 9/0612 |
| 2003/0016747 A1* | 1/2003 | Westerink | ........ H04N 21/44012 |
| | | | 375/240.08 |
| 2003/0048844 A1* | 3/2003 | Mallart | ................ H04N 19/597 |
| | | | 375/240.08 |
| 2003/0053680 A1* | 3/2003 | Lin | ......................... H04S 5/005 |
| | | | 382/154 |
| 2004/0017403 A1 | 1/2004 | Andersson | |
| 2004/0110561 A1 | 6/2004 | Kawamura | |
| 2005/0182608 A1* | 8/2005 | Jahnke | ..................... A63F 13/10 |
| | | | 703/6 |
| 2006/0087987 A1 | 4/2006 | Witt | |
| 2006/0120534 A1 | 6/2006 | Seo | |
| 2006/0146185 A1* | 7/2006 | Chen | .................. H04N 21/2368 |
| | | | 348/410.1 |
| 2008/0270978 A1 | 10/2008 | Leung | |

(Continued)

*Primary Examiner* — Jin Ge
(74) *Attorney, Agent, or Firm* — Blank Rome LLP (57) ABSTRACT

Simulating a 3D audio environment, including receiving a visual representation of an object at a location in a scene, wherein the location represents a point in 3D space, receiving a sound element, and binding the sound element to the visual representation of the object such that a characteristic of the sound element is dynamically modified coincident with a change in location in the scene of the visual representation of the object in 3D space.

20 Claims, 6 Drawing Sheets

(56) References Cited

U.S. PATENT DOCUMENTS

| | | | |
|---|---|---|---|
| 2011/0146085 A1* | 6/2011 | Moffatt | B26D 5/16 30/363 |
| 2013/0028424 A1* | 1/2013 | Kim | H04S 1/002 381/17 |
| 2014/0002582 A1* | 1/2014 | Bear | H04N 13/204 348/14.08 |
| 2014/0233917 A1* | 8/2014 | Xiang | H04S 7/30 386/285 |
| 2014/0314391 A1* | 10/2014 | Kim | G11B 27/28 386/248 |
| 2014/0375630 A1 | 12/2014 | Girdzijauskas | |
| 2015/0195628 A1 | 7/2015 | Lee | |

* cited by examiner

AUTOMATIC RENDERING OF 3D SOUND

BACKGROUND

This disclosure relates generally to the field of graphics processing, and more particularly to the field of automatic rendering of three dimensional (3D) sound. A framework is provided that supports an interface between a graphics framework and an audio framework.

Many programmers use graphics rendering and animation infrastructure as a convenient means for rapid application development, such as for the development of, for example, gaming applications. Many graphics rendering and animation infrastructures allow programmers to create 2D and 3D scenes using complex special effects with limited programming overhead.

For example, Sprite Kit, developed by APPLE INC., provides a graphics rendering and animation infrastructure that programmers may use to animate arbitrary textured two-dimensional images, or "sprites." Sprite Kit uses a traditional rendering loop, whereby the contents of each frame are processed before the frame is rendered. Each individual game determines the contents of the scene and how those contents change in each frame. Sprite Kit then does the work to render the frames of animation efficiently using the graphics hardware on the hosting device. Sprite Kit is optimized so that the positions of sprites may be changed arbitrarily in each frame of animation.

Three-dimensional graphics rendering and animation infrastructures are also commonly used by programmers today and provide a convenient means for developing applications with complex three-dimensional graphics, e.g., gaming applications using three-dimensional characters and/or environments. For example, Scene Kit, developed by APPLE INC., provides an Objective-C framework for building applications and games that use 3D graphics, combining a high-performance rendering engine with a high-level, descriptive API. Scene Kit supports the import, manipulation, and rendering of 3D assets. Unlike lower-level APIs such as OpenGL® that require programmers to implement in precise detail the rendering algorithms that display a scene, Scene Kit only requires descriptions of the scene's contents and the actions or animations that the programmers want the objects in the scene to perform. (OPENGL is a registered trademark of Silicon Graphics International Corporation.)

The Scene Kit framework offers a flexible, scene graph-based system to create and render virtual 3D scenes. With its node-based design, the Scene Kit scene graph abstracts most of the underlying internals of the used components from the programmer. Scene Kit does all the work underneath that is needed to render the scene efficiently using all the potential of the GPU.

One drawback of current frameworks is that graphical programs, such as games, often require additional elements, such as audio features, that must be determined in real time based on actions of various objects in a scene. Incorporating audio features in the graphical framework often requires significant time and resources to determine how the audio features should change when the objects in a scene change.

SUMMARY

In one embodiment, a method to simulate a three-dimensional (3D) audio environment. The method includes receiving a visual representation of an object at a location in a scene, where the location represents a point in 3D space, receiving a sound element, and binding the sound element to the visual representation of the object such that a characteristic of the sound element is dynamically modified coincident with a change in location in the scene of the visual representation of the object in 3D space.

In another embodiment, the method may be embodied in computer executable program code and stored in a non-transitory storage device. In yet another embodiment, the method may be implemented in an electronic device having image capture capabilities.

DETAILED DESCRIPTION

This disclosure pertains to systems, methods, and computer readable media for automatic rendering of 3D sound. In general, techniques are disclosed for receiving a visual representation of an object at a location in a scene, receiving a sound element, and binding the sound element to the visual representation of the object such that a characteristic of the sound element is dynamically modified coincident with a change in location in the scene of the visual representation of the object in 3D space. In one or more embodiments, automatic rendering of 3D sound may also include displaying the visual representation of the object on a display at the location in the scene, and causing the sound element to generate the sound while the visual representation of the object is moving from the location in the scene. In one or more embodiments, the described methods allow developers to attach audio objects to graphical nodes such that as a scene changes, the audio elements for the scene also change. Further, one or more embodiments provide a framework that allows automatic updating of audio characteristics at every frame as an environment is rendered. A developer may only need to describe an environment once, and the framework may dynamically modify the audio or sound characteristics in real time. In one or more embodiments, the described automatic rendering of 3D sound allows developers to avoid the low-level details of loading and rendering 3D media assets.

In the following description, for purposes of explanation, numerous specific details are set forth in order to provide a thorough understanding of the inventive concept. As part of this description, some of this disclosure's drawings represent structures and devices in block diagram form in order to avoid obscuring the inventive concepts. In this context, it should be understood that references to numbered drawing elements without associated identifiers (e.g., 100) refer to all instances of the drawing element with identifiers (e.g., 100A and 100B). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the inventive subject matter. Reference in this disclosure to "one embodiment" or to "an embodiment" means that a particular feature, structure, or characteristic described in connection with the embodiment is included in at least one embodiment of the invention, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Figure 1:
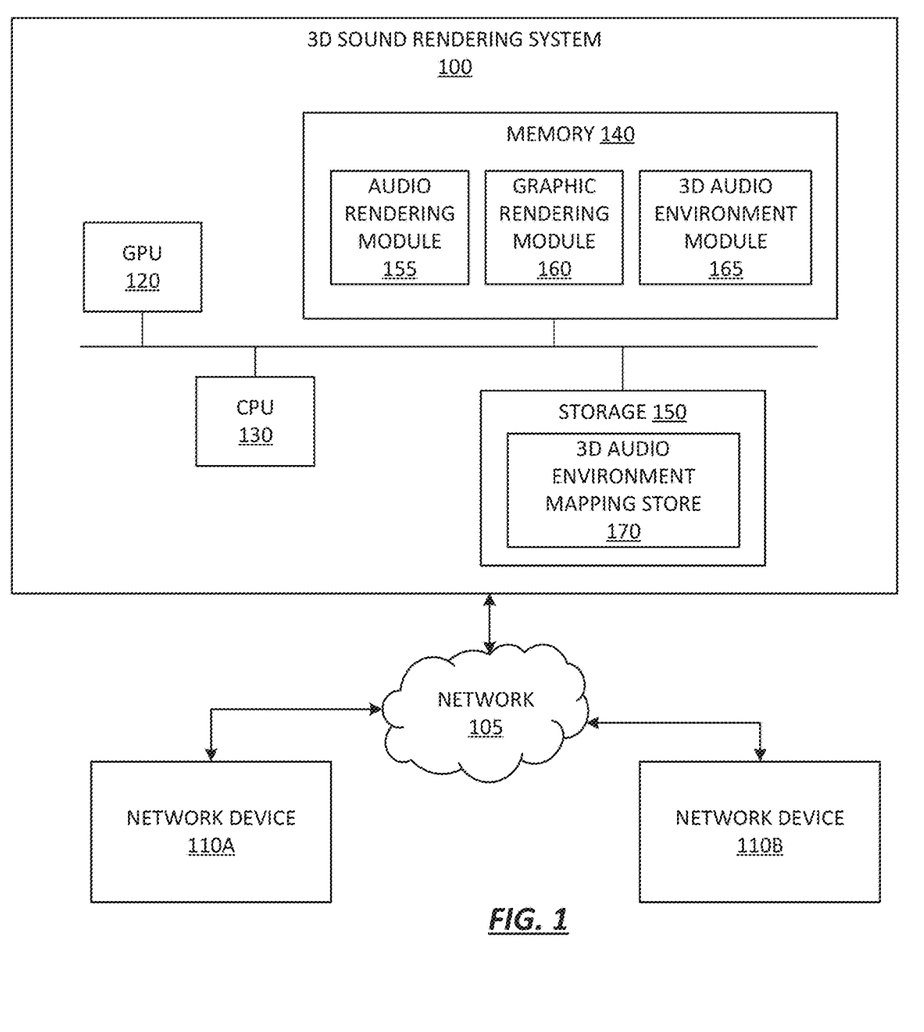
FIG. 1 shows, in block diagram form, an overall view of a network diagram capable of supporting automatic rendering of 3D sound, according to one or more embodiments.

FIG. 1 shows, in block diagram form, an overall view of a network diagram capable of supporting automatic rendering of 3D sound, according to one or more embodiments. Specifically, FIG. 1 depicts a 3D sound rendering system 100 that is a computer system. 3D sound rendering system 100 may be connected to other network devices 110 across network 105. Network devices 100 may include devices such as mobile devices, tablet devices, desktop devices, as well as network storage devices such as servers and the like. Network 105 may be any type of network, wire or wireless, and may be a collection of interconnected networks, even though illustrated in FIG. 1 as a single network.

3D sound rendering system 100 may include a central processing unit (CPU) 130, and a graphics processing unit (GPU) 120. In various embodiments, computing system 100 may comprise a supercomputer, a desktop computer, a laptop computer, a video-game console, an embedded device, a handheld device (e.g., a mobile telephone, smart phone, MP3 player, a camera, a GPS device, or other mobile device), or any other device that includes or is configured to include a GPU. In the embodiment illustrated in FIG. 1, CPU 130 and GPU 120 are included on separate integrated circuits (ICs) or packages. In other embodiments, however, CPU 130 and GPU 120, or the collective functionality thereof, may be included in a single IC or package.

3D sound rendering system 100 may also include a memory 140. Memory 140 may include one or more different types of memory which may be used for performing device functions. For example, memory 140 may include cache, ROM, and/or RAM. Memory 140 may store various programming modules during execution, including audio rendering module 155, graphic rendering module 160, and 3D audio environment module 165.

In one or more embodiments, audio rendering module 155 may include an audio framework, such as AV Audio Engine.

AV Audio Engine allows users to simplify real-time audio. A user may generate an audio graph that includes various connecting audio nodes. Using a framework such as the AV Audio Engine, a developer may create an audio graph using various types of nodes, such as source nodes, process nodes, and destination nodes. In one or more embodiments, source nodes generate a sound, process nodes modify a generated sound in some way, and destination nodes receive sound. For purposes of this disclosure, source nodes may correspond to a sound source, and destination nodes may correspond to a sound listener.

In addition, the various nodes may be associated with characteristics that make a sound a 3D sound. Such characteristics may include, for example, obstruction, occlusion, reference distance, maximum distance, and reverberation. Each of these characteristics may impact how a sound is generated. Each of these various characteristics may be determined using one or more algorithms, and algorithms may vary per node, based on the importance of the node in an audio environment. For example, a more important node might use a more resource-heavy algorithm, whereas a less important node may use a less computationally expensive algorithm.

In one or more embodiments, graphics rendering module 160 is an application that allows a developer to define a spatial representation of objects in a graphical scene. For example, in the instance where a developer is developing a game, two characters might be linked such that they always appear together in 3D space in a scene. As described above, one example of such a framework is Scene Kit, which uses a node-based design to link various objects in a scene. In one or more embodiments, such a framework may include geometry objects that represent a piece of geometry in the scene, camera objects that represent points of view, and light objects that represent light sources. For purposes of clarity in this disclosure, the nodes of the scene tree will be identified as graphics nodes, in order to differentiate the nodes from the audio nodes in the audio graph as described above. The relation of the various graphics nodes may be stored as a scene tree, and each node may be associated with various properties, such as opacity and visibility.

In one or more embodiments, memory 140 may also include a 3D audio environment module 165. The 3D audio environment module 165 provides a means for a developer to bind an audio node from an audio graph to a graphics node in a scene tree, according to one or more embodiments. Thus, when an object moves in 3D space, the 3D audio environment module 165 may merely need to update the 3D location of the audio node's corresponding graphics node.

In one or more embodiments, the scene tree, the audio graph, and the binding between the scene tree and the audio graph may be stored, for example, in 3D audio environment mapping store 170 in memory 140, or in storage 150. In one or more embodiments, the scene tree, the audio graph, and the binding between the scene tree and the audio graph may be stored in the form of a tree, a table, a data base, or any other kind of data structure. Storage 150 may include any storage media accessible by a computer during use to provide instructions and/or data to the computer, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link.

Although the audio rendering module 155, graphic rendering module 160, 3D audio environment module 165, and 3D audio environment mapping store 170 are depicted as being included in the same 3D sound rendering system, the various modules and components may alternatively be found, among the various network devices 110. For example, data may be stored in network storage across network 105. Additionally, the various modules may be hosted by various network devices 110. Moreover, any of the various modules and components could be distributed across the network 105 in any combination.

Figure 2:
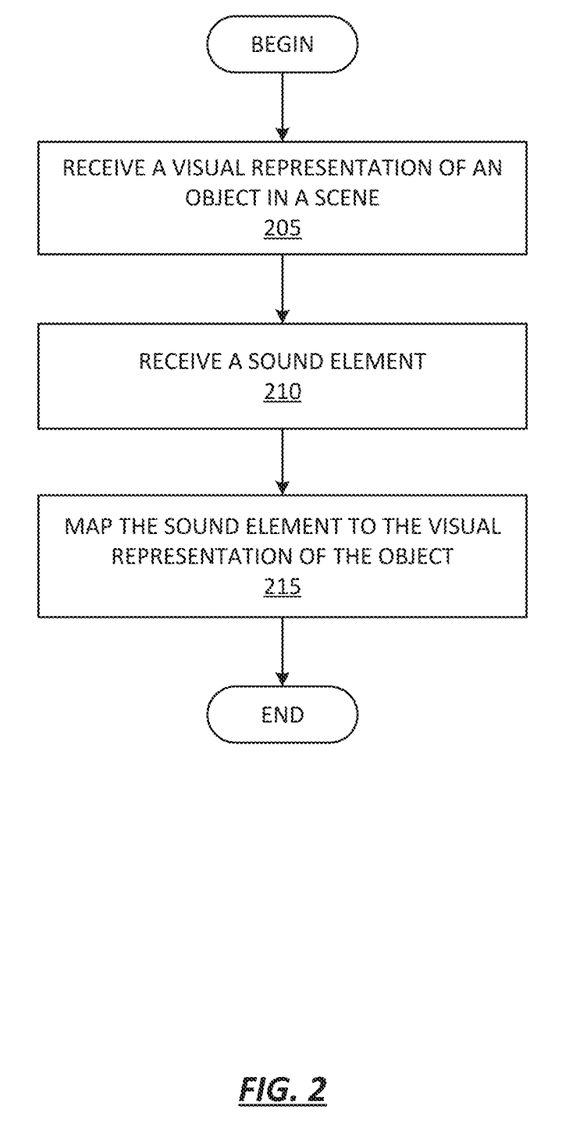
FIG. 2 shows, in flowchart form, a simplified flowchart of a method for binding a graphics node to an audio node, according to one or more embodiments.

Referring to FIG. 2, a simplified flowchart is depicted, in accordance with one or more embodiments of the disclosure. The framework begins at 205 by receiving a visual representation of an object in a scene. The visual representation of the object in a scene may be received from a graphics framework, or may be generated by the current framework. In one or more embodiments, the visual representation may indicate a location of the object in the scene. The location of the object in the scene may be represented, for example, in 2D or 3D space. For example, Scene Kit allows a developer to define an environment using a graph containing nodes representing various objects within a scene. Scene Kit offers a flexible, scene graph-based system to create and render virtual 3D scenes. In one or more embodiments, the environment may be generated by importing models built using 3D authoring tools, such as 3sd max, Maya, and SketchUp. After the 3D model is loaded, the 3D models may be manipulated to render a 3D scene.

The method continues at block 210, and the framework receives a sound element. In one or more embodiments, the sound element may be loaded from an audio file, or created as an audio node, such as an AV Audio node.

The method continues at block 215, and the framework binds the sound element to the visual representation of the object. For example, a graphical node may be bound to a sound element. In one or more embodiments, the object may be bound to the sound element such that the sound begins to play as soon as the sound is bound to the object. In one or more embodiments, the location of the generated sound will move through 3D space as the object moves through 3D space.

In one or more embodiments, the binding between the sound element and the visual representation of the object may cause characteristics of the sound associated with the sound element to dynamically change based on the location of the object to which the sound element is bound. For example, in one or more embodiments, the sound elements may be characterized as sound sources or sound listeners. In the case of a sound source, when the bound object moves within a scene, an apparent location of the sound source moves coincident with the change in location of the object within the scene. In the case of a sound listener, the audio characteristics of sounds remote to the listener may be dynamically modified based on the change in location in the scene of the visual representation of the object.

Figure 3:
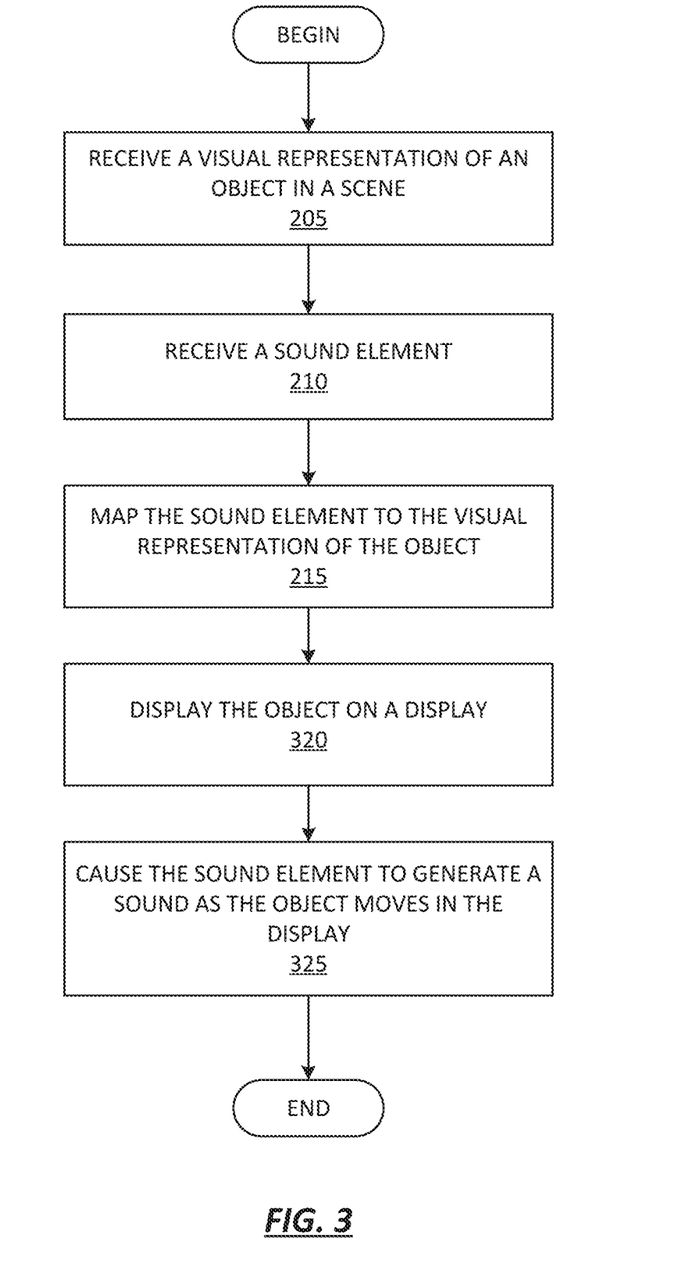
FIG. 3 shows, in flowchart form, a method of automatically rendering a sound element, according to one or more embodiments.

FIG. 3 shows, in flowchart form, a method of automatically rendering a sound element, according to one or more embodiments. FIG. 3 includes the same elements as FIG. 2, and provides additional elements that may be included in automatic rendering of 3D sound according to one or more embodiments. As in FIG. 2, FIG. 3 includes receiving a visual representation of an object in a scene (205), receiving a sound element (210), and binding the sound element to the visual representation of the object (215).

In addition to the features of FIG. 2, FIG. 3 continues at 320 by displaying the object on a display. The object may be displayed as part of a scene at the identified location in the scene. The display may be any display device, as will be discussed below with respect to FIG. 6.

The method continues at 325, and the framework causes the sound element to generate a sound as the object moves in the display. In one or more embodiments, the sound element may be a sound listener, and the sound may be modified as other objects in the scene move away from the bound object. Further, in one or more embodiments, the sound element may be a sound source, and the sound may be modified as the bound object moves within the scene.

It should be understood that the various components of the flowchart described above may be performed in a different order or simultaneously, and some components may even be omitted in one or more embodiments.

Figure 4:
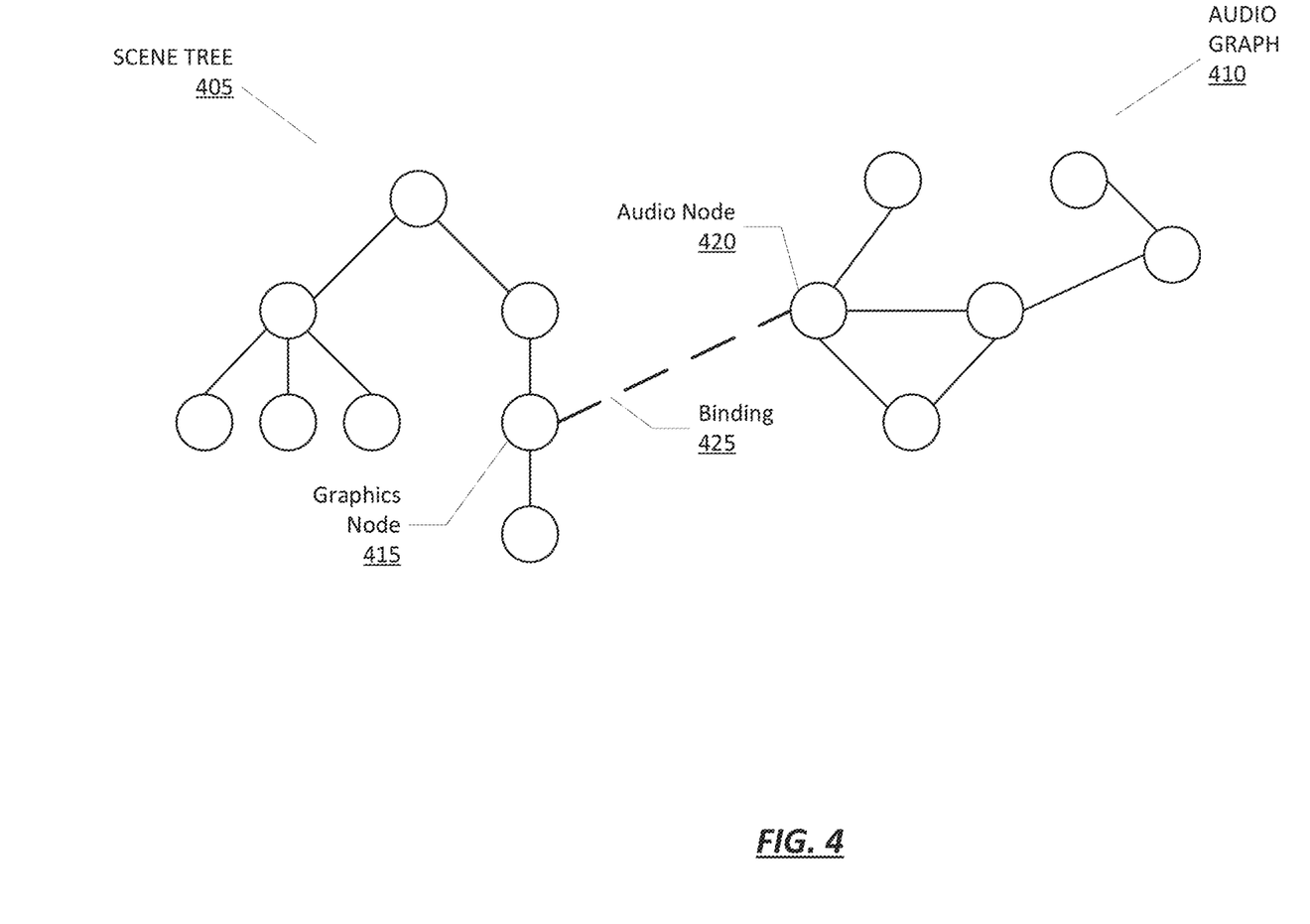
FIG. 4 shows in block diagram form, an example of a binding between a graphics node and an audio node, according to one or more embodiments.

FIG. 4 shows in block diagram form, an example of a binding between a graphics node and an audio node, according to one or more embodiments. As described above, some graphics frameworks such as SceneKit, allow developers to define scenes in environments using a graph containing nodes representing various objects within a scene. In FIG. 4, scene tree 405 may be defined in such a framework. As depicted, scene tree 405 includes various graphics nodes, such as graphics node 415.

FIG. 4 also shows an audio graph 410. It should be understood that the example shown in FIG. 4 is depicted merely for purposes of clarity for the reader, and is not intended to limit the disclosure. As described above, a sound element may be loaded, for example, as a preexisting audio file. In one or more embodiments, certain audio frameworks, such as AV Audio Engine, may be used to render the sound node. AV Audio Engine allows users to simplify real-time audio. An audio node is a basic audio block. There are three types of nodes, including source nodes, process nodes, and destination nodes. In one or more embodiments, source nodes generate a sound, process nodes modify a generated sound in some way, and destination nodes receive sound. As depicted in audio graph 410, any number of source nodes, process nodes, and destination nodes may be connected in the form of a graph.

For purposes of this example, graphics node 415 is mapped by binding 425 to audio node 420. For example, graphics node 415 may represent a player in a game, and audio node 420 may represent a source audio node for that player. In one or more embodiments, binding 425 causes audio node 420 to be modified coincident with a change in location of graphics node 415.

Figure 5:
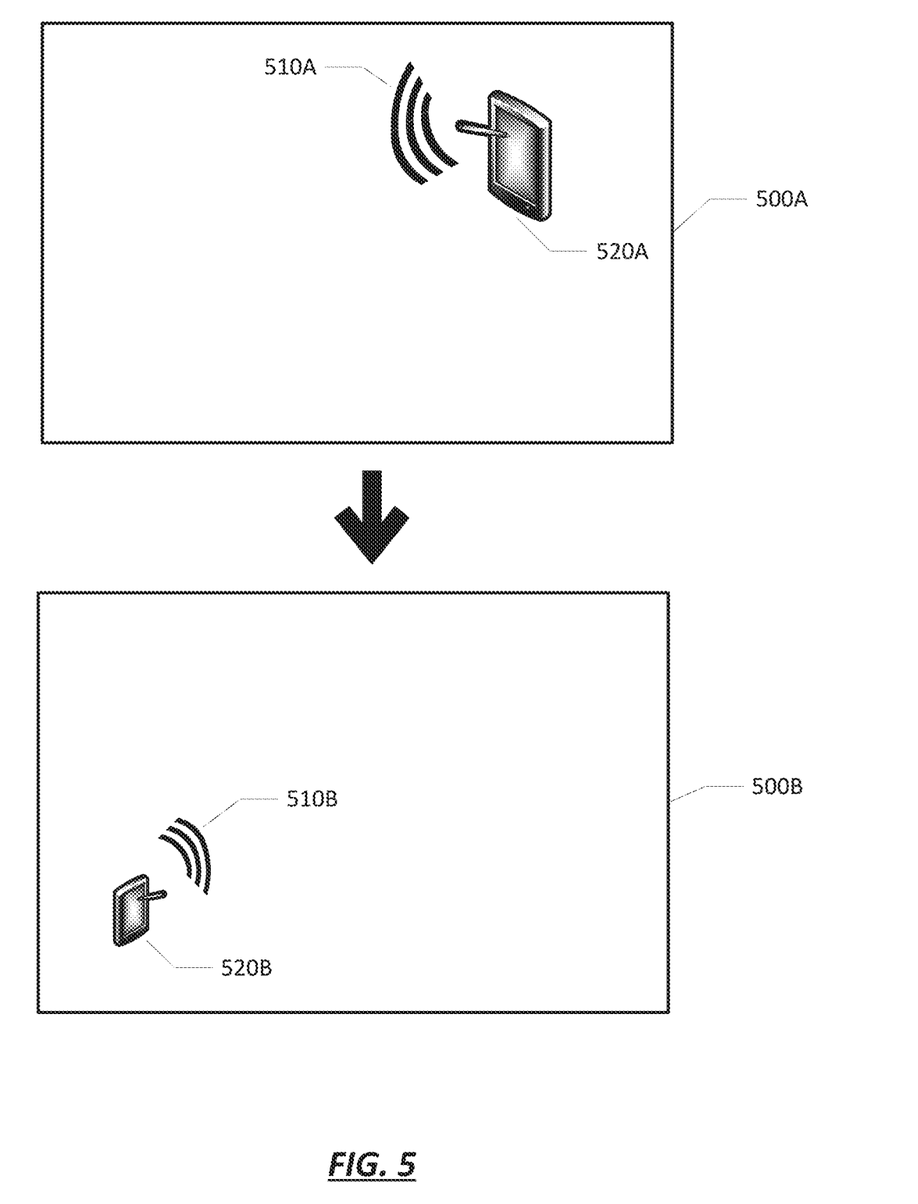
FIG. 5 shows an example flow diagram illustrating automatic rendering of a sound element, according to one or more embodiments.

FIG. 5 shows an example flow diagram illustrating automatic rendering of a sound element, according to one or more embodiments. FIG. 5 shows an example screenshot 500 of 3D audio 510 before and after an object 520 moves through 3D space.

The flow diagram begins with screenshot 500A. The example object 520A, a tablet device, is displayed at a top right corner of the display. Sound element 510A is also depicted at the top right corner of the display to indicate that the apparent source of the sound is coming from the top right corner of the display. For purposes of explanation, the tablet device and the sound element are depicted as taking up a significant amount of the screen to indicate that the object 520A is close to a user.

Screenshot 500B depicts example object 520B after it has moved locations from the top right corner of the display to the bottom left corner. In addition, example object 520B is depicted as smaller than example object 520A to indicate that example object 520B has moved away from a user in 3D space. As a result, because sound element 510 is mapped to object 520, the apparent location of sound element 510B is also now located in the lower left corner of the display. Further, sound element 510B is depicted in the example as smaller than sound element 510A to indicate that the sound in 510B sounds as if the source of the sound is further away than in sound element 510A.

Figure 6:
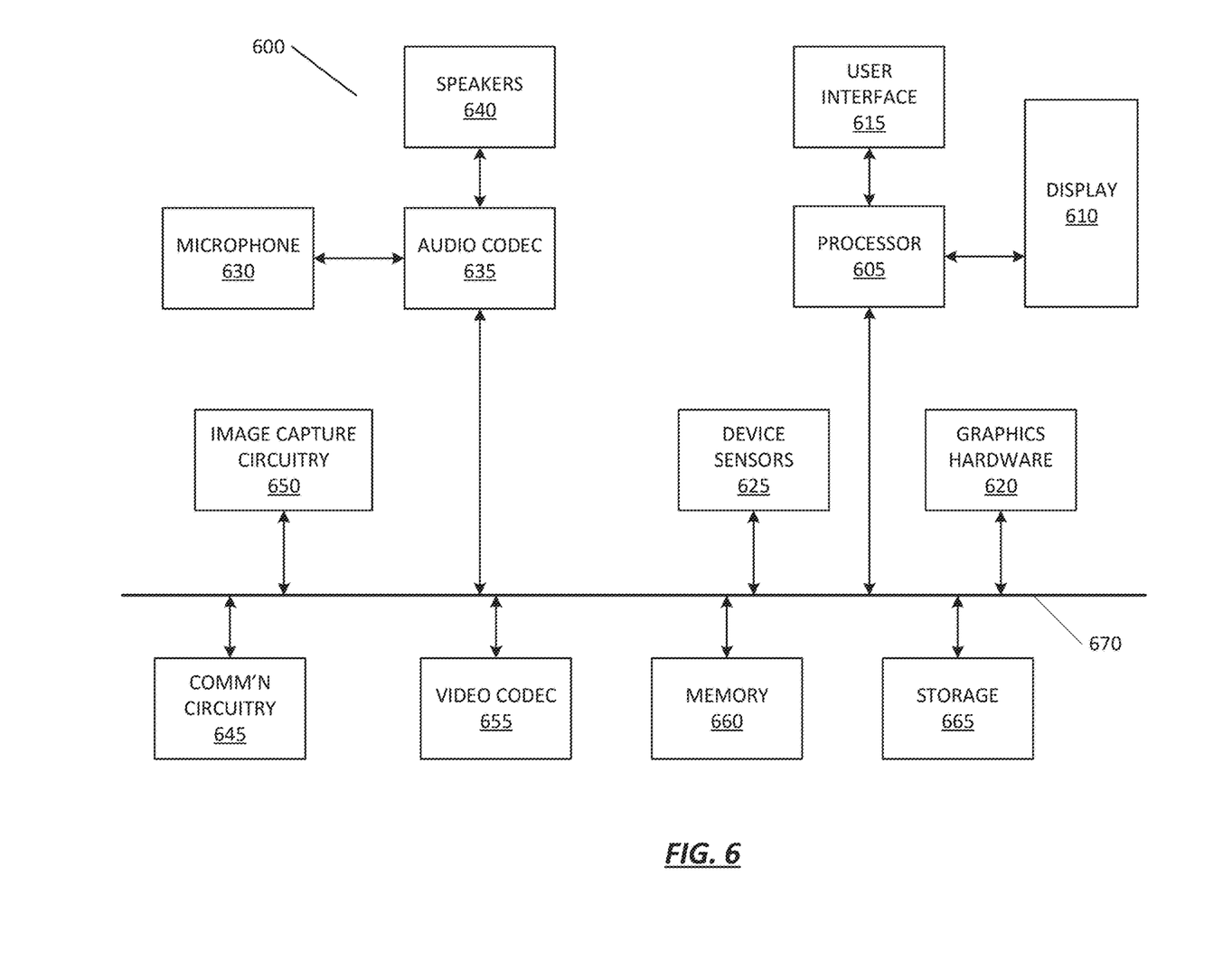
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650 (e.g., including camera system 200) video codec(s) 655, memory 660, storage device 665, and communications bus 670. Multifunction electronic device 600 may be, for example, a personal electronic device such as a personal digital assistant (PDA), personal music player, mobile telephone, laptop computer, desktop computer, or a tablet computer.

Processor 605 may execute instructions necessary to carry out or control the operation of many functions performed by device 600 (e.g., such as the generation and/or processing of images). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

Finally, variations of the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method to simulate a three-dimensional (3D) audio environment, comprising:
    obtaining, from an audiovisual framework, a predefined audio graph comprising an audio node representing a sound element;
    obtaining, from the audiovisual framework, a scene tree for a scene, wherein the scene tree comprises a 3D spatial representation of a plurality of graphic nodes, wherein each of the graphic nodes represents an object in the scene;
    receiving a user input indicative of a request to bind the audio node to a graphic node of the plurality of graphic nodes;
    binding the audio node to the graphic node of the scene tree in accordance with the user input;
    as a location of the object changes across a series of frames, receiving changes in the graphic node and automatically modifying an audio characteristic of the audio node based the binding between the graphic node and the audio node; and
    playing back the sound element corresponding to the audio node with the modified audio characteristic coincident with a presentation of the series of frames.

2. The method of claim 1, wherein the modified audio characteristic of the audio node includes at least one of an obstruction, an occlusion, a reference distance, a maximum distance, and a reverberation of a generated sound.

3. The method of claim 1, wherein the audio node is one of a source audio node, a process audio node, and a destination audio node.

4. The method of claim 3, wherein the source audio node generates a sound, the process audio node modifies the generated sound, and the destination audio node receives sound.

5. The method of claim 1, wherein the audio characteristic of the audio node is automatically modified for every frame in real-time as the environment is rendered.

6. The method of claim 1, wherein the sound element corresponds to a sound source, and wherein an apparent location of the sound source moves coincident with the change in the location of the object in the scene represented by the one of the plurality of graphics nodes, based on the binding and the modifying.

7. The method of claim 1, wherein the sound element corresponds to a sound listener, and wherein audio characteristics of remote sounds are dynamically modified coincident with the change in the location of the given object in the scene represented by the one of the plurality of graphics nodes, based on the binding and the modifying.

8. A system for simulate a three-dimensional (3D) audio environment, comprising:
   one or more processors; and
   memory operatively coupled to a digital image sensor and comprising computer code configured to cause the one or more processors to:
   obtain, from an audiovisual framework, a predefined audio graph comprising an audio node representing a sound element;
   obtain, from the audiovisual framework, a scene tree for a scene, wherein the scene tree comprises a 3D spatial representation of a plurality of graphic nodes, wherein each of the graphic nodes represents an object in the scene;
   receive a user input indicative of a request to bind the audio node to a graphic node of the plurality of graphic nodes;
   bind the audio node to the graphic node of the scene tree in accordance with the user input;
   as a location of the object changes across a series of frames, receiving changes in the graphic node and automatically modifying an audio characteristic of the audio node based on the binding between the graphic node and the audio node; and
   playing back the sound element corresponding to the audio node with the modified audio characteristic coincident with a presentation of the series of frames.

9. The system of claim 8, wherein the modified audio characteristic of the audio node includes at least one of an obstruction, an occlusion, a reference distance, a maximum distance, and a reverberation of a generated sound.

10. The system of claim 8, wherein the audio node is one of a source audio node, a process audio node, and a destination audio node.

11. The system of claim 10, wherein the source audio node generates a sound, the process audio node modifies the generated sound, and the destination audio node receives sound.

12. The system of claim 8, wherein the audio characteristic of the audio node is automatically modified for every frame in real-time as the environment is rendered.

13. The system of claim 8, wherein the sound element corresponds to a sound source, and wherein an apparent location of the sound source moves coincident with the change in the location of the object in the scene represented by the one of the plurality of graphics nodes, based on the binding and the modifying.

14. The system of claim 8, wherein the sound element corresponds to a sound listener, and wherein audio characteristics of remote sounds are dynamically modified coincident with the change in the location of the object in the scene represented by the one of the plurality of graphics nodes, based on the binding and the modifying.

15. A non-transitory computer readable storage device comprising computer code for simulating a three-dimensional (3D) audio environment, the computer code executable by one or more processors to:
   obtain, from an audiovisual framework, a predefined audio graph comprising an audio node representing a sound element;
   obtain, from the audiovisual framework, a scene tree for a scene, wherein the scene tree comprises a 3D spatial representation of a plurality of graphic nodes, wherein each of the graphic nodes represents an object in the scene;
   receive a user input indicative of a request to bind the audio node to a graphic node of the plurality of graphic nodes;
   bind the audio node to the graphic node of the scene tree in accordance with the user input;
   as a location of the object changes across a series of frames, receiving changes in the graphic node and automatically modifying an audio characteristic of the audio node based on the binding between the graphic node and the audio node; and
   playing back the sound element corresponding to the audio node with the modified audio characteristic coincident with a presentation of the series of frames.

16. The non-transitory computer readable storage device of claim 15, wherein the modified audio characteristic of the audio node includes at least one of an obstruction, an occlusion, a reference distance, a maximum distance, and a reverberation of a generated sound.

17. The non-transitory computer readable storage device of claim 15, wherein the audio node is one of a source audio node, a process audio node, and a destination audio node.

18. The non-transitory computer readable storage device of claim 17, wherein the source audio node generates a sound, the process audio node modifies the generated sound, and the destination audio node receives sound.

19. The non-transitory computer readable storage device of claim 15, wherein the audio characteristic of the audio node is automatically modified for every frame in real-time as the environment is rendered.

20. The non-transitory computer readable storage device of claim 15, wherein the sound element corresponds to a sound source, and wherein an apparent location of the sound source moves coincident with the change in the location of the object in the scene represented by the one of the plurality of graphics nodes, based on the binding and the modifying.

* * * * *

UNITED STATES PATENT AND TRADEMARK OFFICE
CERTIFICATE OF CORRECTION

PATENT NO. : 11,423,629 B2
APPLICATION NO. : 16/213708
DATED : August 23, 2022
INVENTOR(S) : Thomas Goossens et al.

It is certified that error appears in the above-identified patent and that said Letters Patent is hereby corrected as shown below:

In the Claims

Claim 7, at Column 8, Line 67 - delete "given"

Signed and Sealed this
Fifteenth Day of November, 2022

Katherine Kelly Vidal
*Director of the United States Patent and Trademark Office*